United States Patent Office 3,477,914
Patented Nov. 11, 1969

3,477,914
TREATING METHOD OF STREPTOCOCCUS HEMOLYTICUS AND THE PREPARATION CONTAINING THE SAID MICROORGANISM
Hajime Okamoto and Saburo Koshimura, Kanazawa-shi, Japan, assignors to Chugai Seiyaku Kabushiki Kaisha and Kyowa Hokko Kogyo Co., Ltd., both of Tokyo, Japan, and both corporations of Japan
No Drawing. Filed Mar. 6, 1967, Ser. No. 620,661
Claims priority, application Japan, Mar. 8, 1966, 41/13,784
Int. Cl. C12k 1/10; A61k 27/00
U.S. Cl. 195—96                                                     11 Claims

ABSTRACT OF THE DISCLOSURE

The present disclosure relates to the production of a potent anti-tumor agent which has inhibited the formation of cancer in mice and has no pathogenicity and no hemolytic activity. The anti-tumor agent is formed from the cells of Streptococcus hemolyticus; the microorganism is cultivated in a medium containing RNA or RNC without additional glucose, the cells are separated and suspended with penicillin at a concentration of greater than 25,000 units/ml., and the supension is incubated first at 30–38° C., preferably for 10–30 minutes, and then heated at 38–50° C., preferably for 20–60 minutes.

---

The present invention relates to the treating of Streptococcus hemolyticus and the preparation containing the said microorganism, and, more particularly, such a preparation which is useful in the inhibition of tumor formation.

It has previously been known that strains of Streptococcus hemolyticus (also called "Streptococcus pyogenes") have anti-tumor activity, but it has been very dangerous to use such a living micororganism as an anti-tumor agent due to its pathogenicity, effecting conditions such as to cause erysipelas. To overcome these defects it has been proposed to use the microorganism in the killed form or a cell-free extract thereof. However, the latter preparations have still proven unsatisfactory.

The present invention provides a new method for treating the cells of Streptococcus hemolyticus to furnish a preparation having anti-tumor activity, and further provides such an antitumor preparation containing the cells of Streptococcus hemolyticus having no pathogenicity and no hemolytic activity, but having a much more potent anti-tumor activity.

We have formerly found that the anti-tumor activity of the cells of Streptococcus hemolyticus is closely and inversely related to streptolysin S forming ability that their anti-tumor activity is increased by cultivating the microorganism in a medium containing ribonucleic acid (called RNA hereinafter) or ribonuclease-core (called RNC hereinafter) and that enhancement of the anti-tumor activity is resulted from incubating the cells of the microorganism, obtained by the cultivation, in a suspension medium containing penicillin at 30–38° C. However, the resultant product is still not entirely satisfactory as an anti-tumor agent. Accordingly, we have now further investigated the subject to obtain a more satisfactory preparation and have found that the cells of the microorganism having no virulence and no hemolytic activity, but having much more potent anti-tumor activity may be obtained by successive heating the cells at 38–50° C.

The treating method of the present invention broadly comprises adding penicillin to a cell-suspension of Streptococcus hemolyticus in a suspension medium to make the concentration greater than 25,000 units of pencillin/ml. of suspension, incubating the mixture at 30–38° C. and then further heating the mixture at 38–50° C. The preferable length of the first incubation time is 10–30 minutes and that of the latter is 20–60 minutes.

As the cells of the microorganism which may be used in the method of the present invention, it is preferable to use a Streptococcus hemolyticus microorganism which is cultivated in a medium without additional glucose. As an example, meat infusion broth and preferably the broth containing RNA or RNC (about 0.5–1% by weight per volume) may be used. In place of meat infusion broth other natural or semi-synthetic media may be used for the cultivation, but glucose cannot be added to such media because the presence of glucose remarkably decreases anti-tumor activity. The cultivation period of the microorganism is preferably 13–20 hours, but it may be slightly different depending upon the quality of the medium and the amount of the seeded micoorganism.

After such a cultivation, the cells of microorganism thus obtained (called "cocci" hereinafter) are separated such as by centrifugation and the resultant sedimented cocci are suspended in a proper suspension medium such as a salt solution, preferably in Bernheimer's basal medium (called BBM hereinafter), which is the soution (pH between 6.8 and 7.0) prepared by adding maltose, $KH_2PO_4$ and $MgSO_4 \cdot 7H_2O$ in distilled water. Phosphate buffered-saline may be used as the suspension medium as well. The penicillin may be added previously, i.e. to the suspension medium above, or it may be added to the suspension of cocci-in-the suspension medium. The most effective amount of penicillin is more than 25,000 units/ml., especially 27,000–60,000 units/ml.

The thus obtained cocci-suspension containing penicillin is first incubated at 30–38° C. for more than 10 minutes, preferably for 10–30 minutes and then further heated at 38–50° C. for 20–60 minutes. Above all, a first incubation at 37° C. for 20 minutes and a successive heating at 45° C. for 30 minutes give the best results.

According to such a process, the anti-tumor activity of the cells of Streptococcus hemolyticus may be increased, regardless of whether the cocci is a virulent one or a virulent one; and simultaneously the virulence of the cocci greatly decreases and the ability of streptolysin S formation is entirely lost.

For obtaining the preparation in a form suitable for administration, the suspension of cocci is made aseptic after the cultivation, and the thus obtained aseptic suspension is diluted to the desired concentration.

The following specific examples in accordance with this invention are illustrative only and should not be construed as limiting the scope of the invention.

EXAMPLE 1

Preferable concentration of penicillin in Streptococci suspension

Preferable concentration of penicillin in streptococci suspension was determined by the following procedure (in vitroin vivo anti-cancer runs):

Living cells of Streptococcus hemolyticus, (Su-strain) derived from 100 ml. of a 20 hour broth culture, were washed two times in physiological saline (called merely "saline" hereinafter) and suspended in 5 ml. of BBM. Thus obtained original cocci-suspension was in all the examples further diluted with BBM to obtain 1:5 and 1:10 diluted suspensions.

To 0.5 ml. of saline solution of penicillin G ($2-32 \times 10^4$ units/ml.) were added 2.5 ml. of the 1:10 dilution cocci-suspension. The tube containing the resultant mixture was then placed in a 37° C. bath for 20 minutes.

On the other hand, the milky ascites fluid (30 ml.), aspirated from mice bearing 8-day-old Ehrlich ascites tumors, was centrifuged at 1,500 r.p.m. for 5 minutes. The sedimented carcinoma cells were washed once with chilled saline and once with chilled BBM, and resuspended in BBM to contain $60 \times 10^6$ cells per ml.

1 ml. of the cancer cell suspension was added to 3 ml. of each penicillin-pretreated cocci-suspension and the mixture was plcaed in a 37° C. bath for 90 minutes. The so incubated suspending mixture (containing penicillin), was used for intraperitoneal inoculation into mice, 0.5 ml. for each mouse (one group:6 mice).

Animals which died during the trial were examined for the cause of death, and animals still alive 50 days after the inoculation were sacrificed and autopsied. At the same time, control experiments were run parallel using a mixture of 0.5 ml. of penicillin solution ($32 \times 10^4$ units/ml.) 2.5 ml. of BBM, and 1 ml. of cancer cell suspension.

The results obtained are as follows:

TABLE I.—ENHANCEMENT IN ANTI-CANCER ACTIVITY OF *STREPTOCOCCUS* HEMOLYTICUS BY PENCILLIN PRETREATMENT IN RELATION TO CONCENTRATION OF PENICILLIN

| Pretreatment of Cocci-suspension at 37° C. for 20 minutes | | In vitro-in vivo anti-cancer runs | | | | |
|---|---|---|---|---|---|---|
| Dilution of original cocci-suspension in BBM | Units of penicillin contained in the diluted cocci-suspension (units/ml.) | Number of survivors after days | | | | |
| | | 10 | 20 | 30 | 40 | 50 |
| 1:10 | $5.4 \times 10^4$ | 6 | 6 | 6 | 6 | ¹6 |
| | $2.7 \times 10^4$ | 6 | 6 | 5 | 5 | ¹5 |
| | $1.3 \times 10^4$ | 6 | 6 | 1 | 1 | ¹1 |
| | $0.7 \times 10^4$ | 6 | 4 | 2 | 1 | ¹1 |
| | $0.3 \times 10^4$ | 6 | 1 | 0 | | |
| Control (BBM without cocci) | $5.4 \times 10^4$ | 6 | 5 | 1 | 0 | |
| | Without penicillin | 6 | 3 | 0 | | |

¹ The animals were sacrificed and autopsied with no tumor finding.

As shown in Table I, the cocci-suspensions received pretreatment with penicillin in concentrations greater than $2.7 \times 10^4$ units/ml. were very effective in causing the inhibition of the invasion power of cancer cells in mice. In the lower concentrations of penicillin, $0.7-1.3 \times 10^4$ units/ml., only 1 out of 6 mice was prevented from cancer cell invasion.

EXAMPLE 2

Length of preincubation time of *Streptococcus hemolyticus* (Su-strain) suspended in BBM containing penicillin The concentration of penicillin in Example 1 was fixed $2.7 \times 10^4$ units/ml. The anti-cancer activity depending upon the length of preincubation time was examined by in vitro-in vivo method. The results are shown in the following Table II.

ml. of BBM. The original cocci-suspension was further diluted with BBM in a ratio of 1:5.

(i) To 30 ml. of the 1:5 diluted cocci-suspension was added 6 ml. of a penicillin solution ($16 \times 10^4$ units/ml. of saline).

(ii) To 30 ml. of the 1:5 diluted cocci-suspension was added 6 ml. of saline.

A portion of each was treated as follows:

(a) Cocci-suspension containing saline incubated at 37° for 20 minutes _____ A (b) Cocci-suspension containing saline incubated at 37° C. for 20 minutes and further heated at 45° for 30 minutes _____ B (c) Cocci-suspension containing penicillin incubated at 37° C. for 20 minutes _____ C (d) Cocci-suspension containing penicillin incubated at 37° C. for 20 minutes and further heated at 45° for 30 minutes _____ D Control runs, in which the cancer cell-bearing mice were given either BBM-saline mixture or BBM-penicillin mixture of the following, were run parallel.

(e) BBM-saline mixture incubated at 37° C. for 20 minutes _____ A'

(f) BBM-saline mixture incubated at 37° C. for 20 minutes and further heated at 45° C. for 30 minutes _____ B'

(g) BBM-Penicillin mixture incubated at 37° C. for 20 minutes _____ C'

(h) BBM-Penicillin mixture incubated at 37° for 20 minutes and further heated at 45° C. for 30 minutes _____ D'

TABLE II.—EFFECT OF LENGTH OF PREINCUBATION TIME ON THE ANTI-CANCER ACTIVITY OF STREPTOCOCCI SUSPENDED IN BBM CONTAINING PENICILLIN

| Dilition of original cocci-suspension in BBM | Minutes of preincubation at 37° C. of diluted cocci-suspension containing penicillin ($2.7 \times 10^4$ u./ml.) | In vitro-in vivo anti-cancer runs | | | | |
|---|---|---|---|---|---|---|
| | | Number of survivors after days | | | | |
| | | 10 | 20 | 30 | 40 | 50 |
| 1:5 | 0 | 6 | 4 | 3 | 1 | 0 |
| | 10 | 6 | 6 | 6 | 6 | ¹6 |
| | 20 | 6 | 6 | 6 | 6 | ¹6 |
| | 40 | 6 | 6 | 6 | 6 | ¹6 |
| | 60 | 6 | 6 | 6 | 6 | ¹6 |
| 1:10 | 0 | 6 | 6 | 6 | 0 | |
| | 10 | 6 | 6 | 6 | 3 | ¹3 |
| | 20 | 6 | 6 | 6 | 6 | ¹6 |
| | 40 | 6 | 6 | 6 | 6 | ¹6 |
| | 60 | 6 | 6 | 6 | 6 | ¹5 |
| Control (without cocci) | BBM containing penicillin ($2.7 \times 10$ u./ml.) 30° C., 30') | 6 | 3 | 0 | | |
| Control (without cocci and penicillin) | BBM only (37° C., 30') | 6 | 1 | 1 | 0 | |

¹ The animals were sacrificed and autopsied with no tumor finding.

EXAMPLE 3

In-vivo anticancer activity of different Streptococcal preparation on cancer-bearing mice Living cells of *Streptococcus hemolyticus* (Su-strain) derived from 300 ml. of a 20 hour broth culture, after being washed twice with saline, were suspended in 15

Anticancer activity was estimated by the following procedures:

The milky ascites fluid aspirated from mice bearing 8-day-old Ehrlich ascites carcinoma was directly diluted with saline to contain approximately $23 \times 10^6$ cancer cells per ml.

All mice (one group:6 mice) were intraperitoneally inoculated with 0.2 ml. of the cancel cell suspension and 24 hours later 0.5 ml. of a streptococcal preparation to be tested was injected intraperitoneally and the same dose was given 4 successive days.

TABLE III.—COMPARATIVE IN VIVO ANTICANCER RUNS WITH FOUR DIFFERENT STREPTOCOCCAL PREPARATIONS

| Series | Kind of streptococcal preparations used for treating cancer-bearing mice | Number of survivors after (days) | | | | |
|---|---|---|---|---|---|---|
| | | 10 | 20 | 30 | 40 | 50 |
| 1:5 diluted cocci-suspension in BBM | A | 6 | 4 | 2 | 2 | 1 [2] |
| | B | 6 | 5 | 5 | 4 | 1 [3] |
| | C | 6 | 4 | 2 | 2 | 1 [2] |
| | D | 6 | 6 | 6 | 6 | 1 [6] |
| Control (without cocci) | A' | 6 | 0 | | | |
| | B' | 6 | 0 | | | |
| | C' | 6 | 0 | | | |
| | D' | 6 | 0 | | | |

[1] The animals were sacrificed and autopsied with no tumor finding.

It can be seen from Table III that among the 4 streptococcal preparations, the D preparation, which was prepared by heating the penicillin-pretreated cocci-suspension, was found to be the most effective.

EXAMPLE 4

Virulence test with four different streptococcal preparations in animals

Original cocci suspension in BBM was prepared as described in Example 3.

Then following four different streptococcal preparations were prepared:
(a) Cocci-suspension (in BBM) incubated at 37° C. for 20 minutes (B-preparation)
(b) Cocci-suspension (in BBM) containing penicillin ($2.5 \times 10^4$ units/ml.) incubated at 37° C. for 20 minutes (PC–B preparation)
(c) Cocci-suspension (in BBM) incubated at 37° C. for 20 minutes and then heated at 45° C. for 30 minutes (B–45 preparation)
(d) Cocci-suspension (in BBM) containing penicillin ($2.5 \times 10^4$ unts/ml.) incubated at 37° C. for 20 minutes and then heated at 45° C. for 30 minutes (PC–B–45 preparation)

Each preparation was diluted with BBM serially, and 0.5 ml. of each dilution was injected intreperitoneally into a mouse (one group:2 mice). The results obtained by using a nearly avirulent strain "Su" ATCC21060, a mutant of a virulent strain "Sv" ATCC21059, are as follows:

TABLE IV.—COMPARATIVE VIRULENCE TESTS WITH 4 DIFFERENT STREPTOCOCCAL PREPARATIONS OF SU-STRAIN

[Number of mice died of infection within 24 hours]

| Streptococcal preparation (Su-strain) | Dilution | | | | |
|---|---|---|---|---|---|
| | Undiluted [1] | 1:2 | 1:20 | 1:50 | 1:100 |
| B | 2 | 2 | 0 | 0 | 0 |
| PC–B | 2 | 0 | 0 | 0 | 0 |
| B–45 | 2 | 2 | 1 | 0 | 0 |
| PC–B–45 | 0 | 0 | 0 | 0 | 0 |

[1] 20-fold concentrate of the cocci contained in their mother broth culture

It is seen that the mice which received intraperitoneally 0.5 ml. of the undiluted PC–B–45 survived without manifesting streptococcal infection, although mice which received undiluted B, PC–B or B–45 died of streptococcal septicemia within 24 hours. Further, death of mice due to infection was caused either by the 1:2 diluted B or by the 1:2 diluted B–45.

The results obtained by using a virulent strain "Sv" ATCC21059 are as follows:

TABLE V.—COMPARATIVE VIRULENCE TESTS WITH 4 DIFFERENT STREPTOCOCCAL PREPARATIONS OF Sv-STRAIN

[Number of mice died of infection within 48 hours]

| Streptococcal preparation (Sv-strain) | Dilution | | | | | | |
|---|---|---|---|---|---|---|---|
| | 1:2,000 [1] | $1:2 \times 10^4$ | $1:2 \times 10^5$ | $1:2 \times 10^6$ | $1:2 \times 10^7$ | $1:20 \times 10$ | $1:2 \times 10$ |
| B | 2 | 2 | 2 | 2 | 0 | 0 | 0 |
| PC–B | 2 | 2 | 2 | 2 | 1 | 0 | 0 |
| B–45 | 2 | 2 | 2 | 2 | 0 | 0 | 0 |
| PC–B–45 | 0 | 0 | 0 | 0 | 0 | 0 | 0 |

[1] Cocci contained in a 1:2000 dilution of each streptococcal preparation corresponds to a 1:1000 dilution of cocci contained in the mother broth culture.

As shown in Table V, death of mice occurred due to infection was caused up to a dilution of 1:2,000,000 of the B, PC–B and B–45 preparations. By contrast, the PC–B–45, even in a dilution of 1:2,000 showed no virulence for mice.

As the results of these experiments, heat-treating of the virulent PC–B preparation yielded the far less virulent preparation, PC–B–45.

EXAMPLE 5

Effect of penicillin on streptolysin S-forming ability (SLS-forming ability) of streptococci suspension (Su-strain)

A series of tubes, each of which contained 3 ml. of a mixture of 2.5 ml. of the original coci-suspension (in BBM) and 0.5 ml. of penicillin solution ($24 \times 10^4$ units/ml.), and a series of control tubes, each of which contained 3 ml. of a mixture of 2.5 ml. of the original cocci-suspension (in BBM) and 0.5 ml. of saline, were set up, and all the tubes of both series were placed in a 37° C. bath for 20 minutes. Then, two of the tubes, one containing the cocci-suspension containing $4 \times 10^4$ units ml. of penicillin from the first series, and the other the cocci-suspension without penicillin from the second series, were placed in a water bath of a stated temperature (0, 37, 45, 56 or 70° C.) for 30 minutes. The two suspending mixtures thus treated were subjected to the following procedures of test for SLS-forming ability of the cocci.

(1) Separation of cocci from their pretreated suspension.
(2) Suspension of the sedimented cocci in resting cell system medium (0.1% RNC BBM), followed by incubation at 37° C. for 2 hours.

(3) Obtaining a clear supernatant by centrifugation (3500 r.p.m. 20′) of the resting cell suspension thus incubated.

(4) Estimation of hemolytic activity of the supernatant.

The clear supernatant was diluted with saline serially. To 1 ml. of each diluted supernatant, 1 ml. of 3% washed rabbit erythrocyte suspension was added, and placed in a 37° C. bath for two hours. The hemolytic activity of the supernatants was expressed as units, in which 1 hemolytic unit (1 H.U.) is the amount of SLS causing gradual disappearance of half of the erythrocytes (50% hemolysis) under these conditions. Thus, the value of hemolytic units was used as the criterion for the SLS-forming ability of Streptocci.

The results are shown in Table VI.

TABLE VI

| | Pretreatment of cocci-susp. | | Strepto-lysin S (H.U./ml) |
|---|---|---|---|
| Medium used for preparing cocci-susp. | Incubation at 37° C. for— | Placing for 30′ at— | |
| | 20′ | 0° C. | 1,971 |
| | 20′ | 37° C. | 1,318 |
| BBM containing penicillin (4×10⁴) u./ml.) | 20′ | 45° C. | <1 |
| | 20′ | 56° C. | <1 |
| | 20′ | 70° C. | <1 |
| | 20′ | 0° C. | 2,457 |
| | 20′ | 37° C. | 2,076 |
| BBM | 20′ | 45° C. | 3,456 |
| | 20′ | 56° C. | <1 |
| | 20′ | 07° C. | <1 |

Heating at 45° C. for 30 minutes of cocci suspended in BBM containing 4×10⁴ units/ml. of penicillin caused a complete loss of their ability to form SLS.

EXAMPLE 6

To 100 ml. of the meat-infusion broth was added RNC to provide 0.8% RNC in the medium; the medium was sterilized (pH 7.56).

The 20 hour-broth culture of Streptococcus hemolyticus (Su-strain) ATCC21060 was seeded in the medium, and incubated at 37° C. for 20 hours.

At the end of incubation period, the broth culture was chilled and centrifuged, and the sedimented cocci was washed 2 times in saline and suspended in 5 ml. of BBM, which is composed of 675 mg. maltose, 6 ml. 20%—$KH_2PO_4$ (adjusted to pH 6.9 with NaOH), 12 ml. 2%—$MgSO_4 \cdot 7H_2O$ and 66 ml. distilled water.

This thus obtained cocci-suspension was further diluted with BBM to obtain 10 times diluted suspension, and to 2.5 ml. of the diluted cocci-suspension was added 0.5 ml. of penicillin solution, which was separately prepared by dissolving penicillin G-potassium salt in saline to make the concentration 16×10⁴ units/ml., and the mixture was incubated at 37° C. for 20 minutes and further heated at 45° C. for 30 minutes.

To the cocci-suspension thus obtained was added 1 ml. of the same cancer cell suspension as was used in Example 1, and the mixture was incubated at 37° C. for 60 minutes. Then, 0.5 ml. of the mixed suspension was injected intraperitoneally to a mouse. Fifty days after the inoculation, number of survivors was checked. Only 1 out of 6 mice died of cancer. The 5 alive mice were sacrificed and autopsied with no tumor finding. In the control experiments using BBM only and BBM containing penicillin, however, all the 6 mice were dead within 35 days after inoculation.

What is claimed is:

1. A method for treating the cells of *Streptococcus hemolyticus* which comprises adding penicillin to a cell-suspension of *Streptococcus hemolyticus* in a suspension medium to make the concentration greater than 25,000 units/ml., incubating the mixture at 30–80° C. for at least 10 minutes and then further heating at 38–50° C.

2. A method claimed in claim 1, in which the first incubation period is 10–30 minutes and successive heating is 20–60 minutes.

3. A method claimed in clam 1, in which the first incubation period is 20 minutes and the further heating period is 30 minutes.

4. A method claimed in claim 1, in which the concentration of penicillin is 27,000–60,000 units/ml.

5. A method claimed in claim 1, in which the suspension medium is Bernheimer's basal medium composed of maltose, $KH_2PO_4(+NaOH)$ and $MgSO_4 \cdot 7H_2O$ and distilled water.

6. A method claimed in claim 1, in which the suspension medium is phosphate-buffered saline.

7. A process for treating the cells of *Streptococcus hemolyticus* which comprises cultivating *Streptococcus hemolyticus* in a medium without additional glucose, separating the microorganism from the broth culture, suspending the separated microorganism in a suspension medium, adding penicillin to the suspension to make the concentration greater than 25,000 units/ml., incubating at 30–38° C. for at least 10 minutes and then further heating at 38–50° C.

8. A process claimed in claim 7 in which the cultivation medium is meat infusion broth without additional glucose.

9. A process claimed in claim 7, in which the cultivating medium contains a member selected from the group consisting of ribonucleic acid, ribonuclease-core and mixtures thereof.

10. A process claimed in claim 9, in which the concentration of one or two of the members of the group consisting of ribonucleic acid and ribonuclease-core is 0.5–1% by weight per volume.

11. The product produced according to the method of claim 1.

References Cited

Okamoto et al., Japanese Journal of Experimental Medicine, vol. 36, pp. 161–174 (1966).

LIONEL M. SHAPIRO, Primary Examiner

U.S. Cl. X.R.

424—93

UNITED STATES PATENT OFFICE
CERTIFICATE OF CORRECTION

Patent No. 3,477,914  Dated November 11, 1969

Inventor(s) HAJIME OKAMOTO et al

It is certified that error appears in the above-identified patent and that said Letters Patent are hereby corrected as shown below:

Table V, Column 6: The last two columns of the heading should be changed to read: "$1:2\times10^8$" and "$1:2\times10^9$", respectively.

Table V, Last Column, first line opposite "B" should read "0"

Table VI, Column 7: Last line, center column should read "70"

SIGNED AND SEALED
MAY 26 1970

(SEAL)
Attest:

Edward M. Fletcher, Jr.
Attesting Officer

WILLIAM E. SCHUYLER, JR.
Commissioner of Patents